United States Patent
Paterno et al.

(10) Patent No.: US 10,507,823 B2
(45) Date of Patent: Dec. 17, 2019

(54) MODE SUGGESTION FOR A VEHICLE POWERTRAIN HAVING A MANUAL TRANSMISSION

(71) Applicant: Ford Global Technologies, LLC, Dearborn, MI (US)

(72) Inventors: Eric Paterno, Detroit, MI (US); Eric Bramson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 15/860,955

(22) Filed: Jan. 3, 2018

(65) Prior Publication Data
US 2019/0202437 A1     Jul. 4, 2019

(51) Int. Cl.
*B60W 20/40*     (2016.01)
*B60W 20/30*     (2016.01)
(Continued)

(52) U.S. Cl.
CPC ............. *B60W 20/40* (2013.01); *B60K 6/387* (2013.01); *B60K 6/445* (2013.01); *B60K 6/46* (2013.01);
(Continued)

(58) Field of Classification Search
CPC ........ Y10T 477/26; B60K 6/46; B60W 20/40; B60W 20/30; B60W 2710/1005;
(Continued)

(56) References Cited

U.S. PATENT DOCUMENTS

| 7,841,433 | B2 | 11/2010 | Soliman et al. |
| 2012/0078477 | A1* | 3/2012 | Takashiro ............... F16H 59/08 |
| | | | 701/52 |

(Continued)

FOREIGN PATENT DOCUMENTS

| EP | 2792563 | 10/2014 |
| EP | 2783935 | 3/2017 |
| JP | 2008001258 | 1/2008 |

OTHER PUBLICATIONS

U.S. Appl. No. 15/381,586, filed Jan. 27, 2017.
(Continued)

*Primary Examiner* — Roger L Pang
(74) *Attorney, Agent, or Firm* — David Kelley; Carlson, Gaskey & Olds, P.C.

(57) ABSTRACT

An exemplary powertrain assembly includes, an electric machine, an engine, and a controller. The electric machine selectively drives at least one wheel driveshaft when in an automatic drive mode. The engine, through the manual transmission, selectively drives at least one wheel driveshaft when in a manual drive mode. The controller is configured to initiate an alert that suggests a transition from the automatic drive mode to the manual drive mode. An exemplary vehicle control method includes initiating an alert to suggest a transition from an automatic drive mode to a manual drive mode. When in the automatic drive mode, the method drives at least one wheel driveshaft within a plurality of wheel driveshafts using torque from an electric machine that is not moved through a manual transmission. When in the manual drive mode, the method drives at least one wheel driveshaft within the plurality of wheel driveshafts with torque from an engine that is moved through a manual transmission.

9 Claims, 2 Drawing Sheets

(51) Int. Cl.

| | | |
|---|---|---|
| *B60K 6/445* | (2007.10) | |
| *B60K 6/547* | (2007.10) | |
| *B60K 6/46* | (2007.10) | |
| *B60W 10/115* | (2012.01) | |
| *F16H 3/72* | (2006.01) | |
| *B60K 6/387* | (2007.10) | |
| *B60W 10/06* | (2006.01) | |
| *B60W 10/08* | (2006.01) | |
| *B60W 10/11* | (2012.01) | |
| *B60W 20/20* | (2016.01) | |
| *B60W 30/182* | (2012.01) | |
| *B60W 20/10* | (2016.01) | |

(52) U.S. Cl.
CPC ........... *B60K 6/547* (2013.01); *B60W 10/115* (2013.01); *B60W 20/30* (2013.01); *F16H 3/728* (2013.01); *B60W 10/06* (2013.01); *B60W 10/08* (2013.01); *B60W 10/11* (2013.01); *B60W 20/10* (2013.01); *B60W 20/20* (2013.01); *B60W 30/182* (2013.01); *B60W 2710/1005* (2013.01); *Y10T 477/26* (2015.01)

(58) Field of Classification Search
CPC ...... B60W 10/06; B60W 10/08; B60W 10/11; B60W 30/182; B60W 20/20; B60W 20/10
USPC .......................................................... 701/52
See application file for complete search history.

(56) References Cited

U.S. PATENT DOCUMENTS

| | | | | |
|---|---|---|---|---|
| 2013/0332015 | A1* | 12/2013 | Dextreit | B60K 6/448 701/22 |
| 2014/0257653 | A1* | 9/2014 | Sato | B60K 6/445 701/55 |
| 2016/0244049 | A1* | 8/2016 | Petridis | B60W 20/30 |
| 2016/0288800 | A1* | 10/2016 | Saito | B60W 50/14 |
| 2017/0072943 | A1* | 3/2017 | Pedlar | B60K 6/36 |
| 2018/0329414 | A1* | 11/2018 | Igarashi | B60W 50/14 |

OTHER PUBLICATIONS

2015 Honda CR-Z—Official Site, 2016 | 2015 CR-Z—Features—Performance, retrieved from http://automobiles.honda.com/2015/cr-z/performance.aspx on Nov. 21, 2016.

\* cited by examiner

MODE SUGGESTION FOR A VEHICLE POWERTRAIN HAVING A MANUAL TRANSMISSION

TECHNICAL FIELD

This disclosure relates generally to suggesting operating modes for an electrified vehicle having a powertrain that incorporates a manual transmission.

BACKGROUND

Electrified vehicles differ from conventional motor vehicles because, among other things, electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), etc.

Some electrified vehicles include automatic transmissions that operate without requiring a driver to depress a shift pedal to disengage a clutch. Some electrified vehicles can include a continuously variable transmissions (CVT) to adjust gear ratios between an internal combustion engine and wheels of the hybrid vehicle.

Manual transmissions, in contrast to automatic transmissions, require a driver to manually shift between fixed gears ratios. The driver can shift between the fixed gear ratios by depressing a clutch pedal to disengage a clutch, and then repositioning a gearshift within a shift gate.

SUMMARY

A powertrain assembly according to an exemplary aspect of the present disclosure includes, among other things, an electric machine, an engine, and a controller. The electric machine can selectively drive at least one wheel driveshaft when in an automatic drive mode. The engine, through the manual transmission, selectively drives the wheel driveshaft when in a manual drive mode. The controller is configured to initiate an alert that suggests a transition from the automatic drive mode to the manual drive mode.

In a further non-limiting embodiment of the foregoing powertrain assembly, the transition to the manual drive mode is a transition from the automatic drive mode.

In a further non-limiting embodiment of any of the foregoing powertrain assemblies, the alert that suggests the transition to the manual drive mode comprises a suggestion of a numbered gear.

In a further non-limiting embodiment of any of the foregoing powertrain assemblies, the controller is further configured to initiate another alert that, when in the manual drive mode, suggests a transition from the manual drive mode to the automatic drive mode.

In a further non-limiting embodiment of any of the foregoing powertrain assemblies the electric machine is a first electric machine. The assembly further includes a second electric machine that, through the manual transmission, selectively drives at least one wheel driveshaft when in the manual drive mode.

In a further non-limiting embodiment of any of the foregoing powertrain assemblies, the engine selectively drives the at least one second electric machine to generate electrical power that charges a traction battery, powers the at least one first electric machine, or both.

A further non-limiting embodiment of any of the foregoing powertrain assemblies includes a clutch that moves between an engaged position where the engine and the at least one second electric machine are rotatably coupled to the manual transmission, and a disengaged position where the engine and the at least one second electric machine are rotatably decoupled from the manual transmission.

In a further non-limiting embodiment of any of the foregoing powertrain assemblies, the manual transmission includes a plurality of selectable gear positions. Each of the gear positions provides a different gear ratio through which the engine, the electric machine, or both can drive the wheel driveshafts.

A further non-limiting embodiment of any of the foregoing powertrain assemblies includes a gearshift moveable between an automatic drive region and a manual shift region. The manual transmission is in neutral when the gearshift is in the automatic drive region.

A further non-limiting embodiment of any of the foregoing powertrain assemblies includes a display within a passenger cabin of a vehicle. The alert is displayed on the display.

A vehicle control method according to another exemplary aspect of the present disclosure includes initiating an alert to suggest a transition from an automatic drive mode to a manual drive mode. When in the automatic drive mode, the method drives at least one wheel driveshaft using torque from an electric machine that is not moved through a manual transmission. When in the manual drive mode, the method drives at least one wheel driveshaft with torque that is moved through a manual transmission.

In a further non-limiting embodiment of the foregoing method, the transition to the manual drive mode is a transition from the automatic drive mode.

In a further non-limiting embodiment of any of the foregoing methods, the alert comprises a suggestion of a numbered gear.

A further non-limiting embodiment of any of the foregoing methods includes, when in the manual drive mode, initiating an alert to suggest a transition from the manual drive mode to an automatic drive mode.

In a further non-limiting embodiment of any of the foregoing methods, the initiating is in response to differences between operating in the automatic drive mode and operating in the manual drive mode.

A further non-limiting embodiment of any of the foregoing methods includes displaying the alert within a passenger compartment of a vehicle having the wheel driveshafts.

A further non-limiting embodiment of any of the foregoing methods includes displaying the alert as a numbered gear.

A further non-limiting embodiment of any of the foregoing methods includes shifting a shift lever within a shift gate to change a gear ratio within the manual transmission.

A further non-limiting embodiment of any of the foregoing methods includes moving a shift lever within a shift gate to change from the manual drive mode to the automatic drive mode, and from the automatic drive mode back to the manual drive mode.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure is directed toward a powertrain of an electrified vehicle. The powertrain incorporates a manual transmission. A driver can operate the vehicle in an automatic drive mode with the manual transmission in neutral. The driver can also operate the vehicle in a manual drive mode, where the driver manually shifts gears of the manual transmission by, for example, depressing a clutch pedal and repositioning a gearshift within a shift gate.

The vehicle can suggest that the driver operate the vehicle in the automatic drive mode or the manual drive mode based on differences between the modes.

Figure 1:
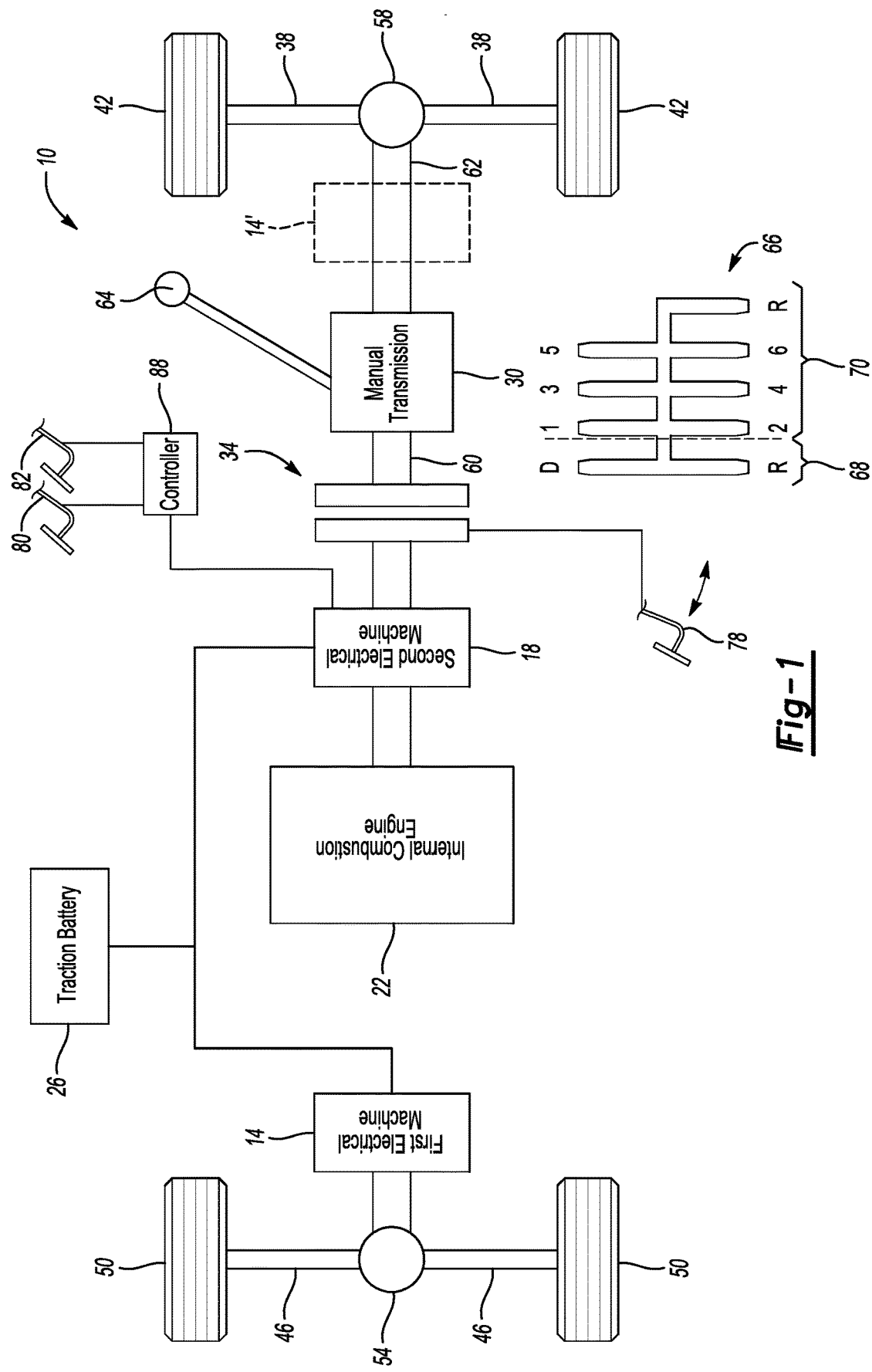
FIG. 1 illustrates a schematic view of an example powertrain for an electrified vehicle.

FIG. 1 illustrates an example powertrain assembly 10 for an electrified vehicle. Although depicted as a hybrid electric vehicle (HEV), it should be understood that the concepts described herein are not limited to the specific HEV disclosed, and could extend to any other types of electrified vehicles, including, but not limited to, plug-in hybrid electric vehicles (PHEVs), etc.

The powertrain 10 includes a first electric machine 14, a second electric machine 18, an internal combustion engine 22, a traction battery 26, a manual transmission 30, and a clutch 34. The powertrain 10 further includes wheel driveshafts 38 connected to respective front wheels 42, and wheel driveshafts 46 connected to respective rear wheels 50. The wheel driveshafts 38 together provide a front axle. The wheel driveshafts 46 together provide a rear axle.

In examples where the powertrain 10 is used within a PHEV, the traction battery 26 could be charged by plugging into an external electric power source, such as a charging station.

In this exemplary non-limiting embodiment, the first electric machine 14 is an electric rear axle drive (eRAD). The first electric machine 14 is powered from the traction battery 26. The first electric machine 14 can operate to rotate a differential 54, which rotates the wheel driveshafts 46 to drive the rear wheels 50.

In some examples, the first electric machine 14 can be used for regenerative braking where regenerative torque from the wheel driveshafts 46 rotates the first electric machine 14 to generate power that is used to charge the traction battery 26.

The second electric machine 18 is also powered from the traction battery 26. When the clutch 34 is engaged and the manual transmission 30 is in a gear, the second electric machine 18 can operate to rotate a differential 58, which rotates the wheel driveshafts 38 to drive the front wheels 42. As will be explained, the internal combustion engine 22 can also be used to selectively rotate the wheel driveshafts 38.

Thus, in this exemplary, non-limiting embodiment, the driveshafts 38 are selectively driven by the second electric machine 18, the internal combustion engine 22, or both. Also, the driveshafts 46 are selectively driven by the first electric machine 14. In another embodiment, the first electric machine, the second electric machine, and the internal combustion engine could each selectively drive the same driveshaft or driveshafts. That is, the first electric machine, the second electric machine, and the internal combustion engine could each selectively drive the driveshafts of a front axle. In such an embodiment, the first electric machine 14 could be repositioned to be between the manual transmission 30 and the differential 58 while still remaining electrically connected to the traction battery 26. The repositioning of the first electric machine 14 in such the embodiment is represented by box 14' in FIG. 1.

Referring again to the embodiment of FIG. 1 where the first electric machine 14 is used to selectively drive the driveshafts 46, when the second electric machine 18 is used to drive the wheel driveshafts 38, the clutch 34 is in an engaged position and the manual transmission 30 is in gear.

The second electric machine 18 can also be used for regenerative braking where regenerative torque from the wheel driveshafts 38 drives the second electric machine 18 to generate power that is used to charge the traction battery 26. When regenerative braking using the second electric machine 18, the clutch 34 is in an engaged position and the manual transmission 30 is in gear.

The second electric machine 18 can also act as a generator where the internal combustion engine 22 drives the second electric machine 18 to generate power that is used to charge the traction battery 26, power the first electric machine 14, or both. In the exemplary non-limiting embodiment, the internal combustion engine 22 is coupled to the second electric machine 18 without adjustable gears between the internal combustion engine 22 and the second electric machine 18. The rotational speed of the second electric machine 18 thus varies linearly with the rotational speed of internal combustion engine 22.

In another non-limiting embodiment, the internal combustion engine 22 is rotatably coupled to the second electric machine 18 through an adjustable gear set (not shown), such as a planetary gear set. Of course, other types of adjustable gear sets, including other gear sets and transmissions, can be used to couple the internal combustion engine 22 to the second electric machine 18. The adjustable gear set permits adjustments to the rotational speed of the second electric machine 18 relative to the rotational speed of the internal combustion engine 22.

In another non-limiting embodiment, the internal combustion engine 22 is rotatably coupled to the second electric machine 18 through a disconnect clutch different from the clutch 34. The clutch 34 could, for example, be an e-clutch, which permits the internal combustion engine 22 to be automatically disconnected from the front wheels 42 when in manual drive mode.

The manual transmission 30 controls a rotational speed of a first shaft 60 relative to a rotational speed of a second shaft 62. The manual transmission 30 can include a set of gears that are repositioned to change a gear ratio between the first shaft 60 and the second shaft 62. The manual transmission 30 can be decoupled from other portions of the powertrain 10 by moving the clutch 34 from the engaged position to a disengaged position.

A driver can choose between operating the exemplary powertrain 10 in the automatic drive mode or the manual drive mode. In the automatic drive mode, the manual transmission 30 is in a neutral position where the first shaft 60 and the second shaft 62 are free to rotate relative to each other. That is, when the manual transmission 30 is in the neutral position, the first shaft 60 is not coupled in rotation together with the second shaft 62. In the manual drive mode, the first shaft 60 is coupled in rotation together with the second shaft 62. In the manual drive mode, the driver can manually change a gear ratio of the manual transmission 30 to change the rotational speed of the first shaft 60 relative to the second shaft 62.

In an exemplary non-limiting embodiment, the driver can move a gearshift (not shown) within a shift gate 66 to change between the automatic drive mode and the manual drive mode. The manual transmission 30 is shifted to neutral in response to the driver shifting to an automatic drive mode from a manual drive mode. In the manual drive mode, the driver can move the gearshift within the shift gate 66 to change the gear ratio within the manual transmission 30.

The shift gate 66 includes an automatic drive region 68 and a manual shift region 70. Positioning the gearshift within the automatic drive region 68 causes the manual transmission 30 to move to a neutral position. Within the automatic drive region 68, the driver can position the gearshift in a position D where the powertrain 10 drives the vehicle in a forward direction, or a position R where the vehicle is driven in a rearward direction.

If the driver desires to operate the powertrain 10 in the manual drive mode, the driver moves the gearshift to the manual shift region 70. Within the manual shift region 70, the driver can position the gearshift within a reverse gear or within one of six forward gears. If the gearshift is within the manual shift region 70, but not in the reverse gear or within one of the six forward gears, the manual transmission 30 is in a neutral position. Although the disclosed non-limiting embodiment includes the manual shift region 70 with six forward gears, other examples could include manual shift regions having more than six or less than six forward gears.

In the manual drive mode, the driver can control gear ratios between the first shaft 60 and the second shaft 62. When the powertrain 10 is in the manual drive mode, manually shifting into a gear that would overspeed the internal combustion engine 22 can be prevented by, for example, a lockout on the gearshift.

When moving the gearshift, the driver can depress a clutch pedal 78 to cause the clutch 34 to move from an engaged position to the disengaged position. Then, when the gearshift is in a desired position, the driver lifts off the clutch pedal 78 to cause the clutch 34 to move back to the engaged position. A rotational input can move through the clutch 34 when the clutch 34 is in the engaged position, but not when the clutch 34 is in the disengaged position.

In some examples, the manual transmission 30 is an automated manual transmission where the driver manually shifts between gears when in the manual drive mode without requiring the driver to depress the clutch pedal 78. The driver could, for example, shift between gears using paddle shifters, which could be located behind a steering wheel of the vehicle relative to the driver.

Moving the gearshift within the shift gate 66 across the boundary from the automatic drive region 68 to the manual shift region 70 can automatically start the internal combustion engine 22 so that the internal combustion engine 22 can drive the wheel driveshafts 38 through the manual transmission 30. When the gearshift is in a numbered gear or reverse "R" of the manual shift region 70, the powertrain 10 can operate in, for example, a parallel hybrid mode, with the first electric machine 14 driving the wheel driveshafts 46 and the internal combustion engine 22 driving the wheel driveshafts 38. Notably, actuating the clutch pedal 34 is used when switching between the numbered gears or reverse "R" gear of the manual shift region 70. Actuating the clutch pedal 34 to disengage clutch 34 is not, in this example, required when moving the gearshift across the boundary between the automatic drive region 68 and the manual shift region 70, or when moving between automatic gears.

When the gearshift is in the automatic drive region 68, the powertrain 10 is in an automatic drive mode where the manual transmission 30 is in neutral and the powertrain 10 is, for example, operated in a series hybrid or pure electric mode (RWD). In the automatic drive mode, a powertrain controller can command the internal combustion engine 22 to start in order to provide power to the traction battery 26 or the first electric machine 14.

In this exemplary non-limiting embodiment, the driver can depress an accelerator pedal 80 to request an acceleration of the vehicle using the powertrain 10. The driver can depress a brake pedal 82 to request a deceleration of the vehicle using the powertrain 10.

The driver can operate the powertrain 10 in various ways. The driver can, for example, choose to rely on some combination of the first electric machine 14, the second electric machine 18, or the internal combustion engine 22 to provide drive torque.

There are performance differences, and other differences, between operating the powertrain 10 in the automatic drive mode and operating the powertrain in the manual drive mode. Often, these differences are difficult for a driver of the vehicle to ascertain during a drive cycle.

In the exemplary embodiment, selected differences of the example powertrain 10 are accessed by a controller 88. If another mode would provide some improvements, the driver is automatically prompted to transition to that mode.

For example, fuel economy over a given stretch of road when operating the powertrain 10 in automatic drive mode can be, in some situations, better than operating the powertrain 10 in the manual drive mode over that stretch of road. In such situations, switching from the manual drive mode to the automatic drive mode can improve fuel economy.

Another reason for switching from the manual drive mode to the automatic drive mode could be to facilitate turning off the engine. When in the automatic drive mode the system can decide to turn the engine off based on, for example, driving conditions and battery conditions. The vehicle, with the engine turned off, can then operate in an electric mode. Shutting off the engine when in the manual drive mode (with the clutch engaged) can be undesirable during ordinary operation.

The automatic drive mode and the manual drive mode have other performance differences. For example, the manual drive mode may permit the application of more wheel torque than the automatic drive mode. In such situations, transitioning from the automatic drive mode to the manual drive mode would permit the powertrain to apply more wheel torque.

Another difference between the automatic and manual drive mode can include comfort differences. For example, a driver or passenger may view the automatic drive mode as providing a more comfortable ride. The driver may view the automatic drive mode as more comfortable than the manual drive mode because the driver does not need to shift between manual gears in the automatic drive mode.

Yet another difference between the automatic and manual drive mode can include traction differences. For example, in the exemplary embodiment, the manual drive mode where two axles are driven may be more desirable than an automatic drive mode where only one axle is driven.

Still other differences between the automatic and manual drive modes can include regenerative braking differences.

Figure 2:
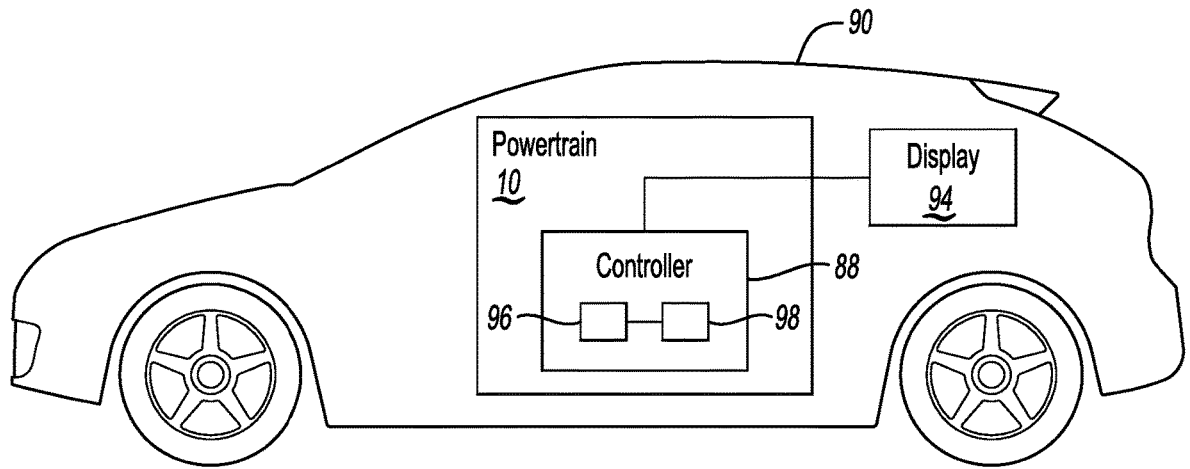
FIG. 2 schematically illustrates the electrified vehicle incorporating the powertrain of FIG. 1.

Referring now to FIG. 2 with continuing reference to FIG. 1, a vehicle 90 incorporating the powertrain 10 includes a display 94 within a passenger cabin. The display can be a touchscreen of a human machine interface. The vehicle 90 can, through the display 94, communicate an alert to the driver that suggests a transition from the automatic drive mode to the manual drive mode, or vice versa. The communication can be based on differences between operating the vehicle 90 in the automatic drive mode or the manual drive mode. The difference can be a difference in fuel efficiency, for example.

The alert, in the exemplary embodiment, is a pop-up text message on the display 94. Other types of alerts are possible and could fall within the scope of this disclosure. The other alerts could include in-dash alerts, tactile feedback, flashing indicators, audible alerts, etc.

In this example, the controller 88 initiates the alert. The controller 88 can initiate the alert in response to one or more user preferences. For example, the driver can interact with the display 94 to provide an input to the controller 88 as a user preference. The user preference can indicate that the mode suggested in the alert should be a more fuel efficient mode. The user preferences can be established prior to a drive cycle. Other exemplary user preferences could include comfort, wheel torque, traction, etc. Substantially any difference between the automatic and manual drive mode can be established as a user preference, and then utilized when the controller 88 calculates which of the modes to suggest.

In response to the alert, the driver can initiate a transition of the powertrain 10 to the suggested mode. The driver could, for example, touch a prompt on the display 84 to initiate the transition. Other examples could include initiating the transition by actuating a button on a steering wheel of the vehicle 90, or a button on a shifter of the vehicle 90. In another example, the driver could actuate a shift lever to initiate the transition. The driver can also choose a mode independent of the alert. For example, the driver could choose a traction mode if the driver detects slippery conditions. Thus, mode changes do not have to be initiated by the controller 88.

The controller 88 can be part of a powertrain controller, such as an electronic engine controller ("EEC"). The controller 88 could also be a battery electric control module. In some examples, the controller 88 comprises portions of several separate vehicle control modules.

The controller 88, in this example, includes a processor 96 operatively linked to a memory portion 98. The example processor 96 is programmed to execute a program stored in the memory portion 98. The program may be stored in the memory portion 98 as software code. The program stored in the memory portion 98 may include one or more additional or separate programs, each of which includes an ordered list of executable instructions for implementing logical functions.

The processor 96 can be a custom made or commercially available processor, a central processing unit (CPU), an auxiliary processor among several processors associated with the controller 88, a semiconductor based microprocessor (in the form of a microchip or chip set) or generally any device for executing software instructions.

The memory portion 98 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

Figure 3:
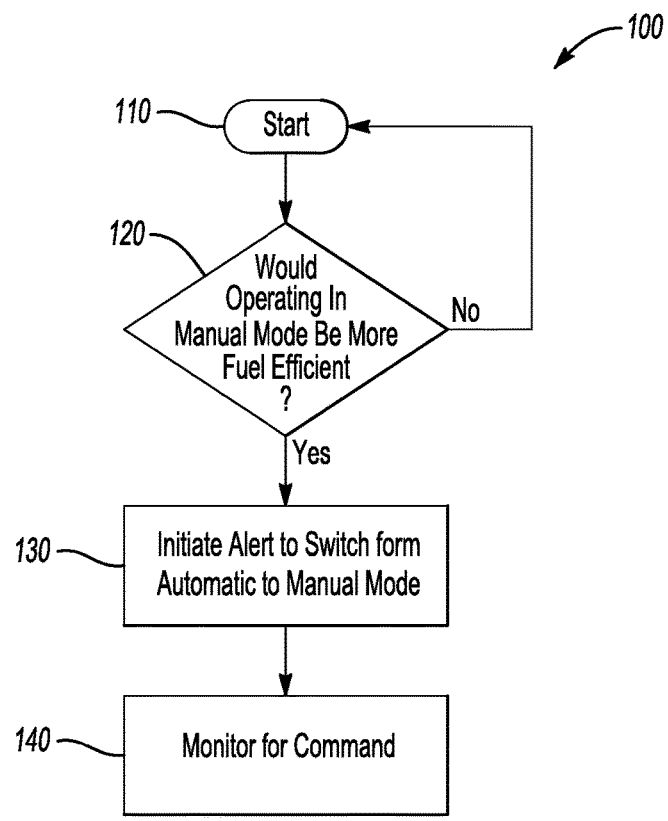
FIG. 3 schematically illustrates the flow of an example method of controlling the electrified vehicle of FIG. 1.

According to an exemplary embodiment and with reference to FIG. 3, a vehicle control method 100 for the vehicle 90 starts at a step 110. Next, the method 100 moves to a step 120. At the step 120, the controller 88 calculates, when the vehicle 90 is operating in the automatic drive mode, whether operating in the manual drive mode would be more fuel efficient. A person having skill in this art and the benefit of this disclosure would understand how to program a controller to execute such a calculation. Among other things, the calculation could involve estimating a fuel efficiency when operating in the manual drive mode and comparing the estimate to an actual fuel efficiency to identify any difference between the two.

The calculation of fuel efficiency can take into account various operating conditions when applicable such as, for example, vehicle speed, current mode (here, automatic), current gear (if instead in manual drive mode), engine speed, engine load, current battery power (input/output), motor current, pedal position, and environmental conditions. At the step 120, the current energy use is calculated and compared to the calculated energy use in each manual gear.

If the manual drive mode would not be more fuel efficient, the method 100 remains looping through the step 120.

If the manual drive mode would be more fuel efficient, the method 100 moves to the step 130. At the step 130, the controller 88 initiates an alert to suggest a transition from an automatic drive mode to a manual drive mode.

At the step 120, instead of assessing whether manual mode would be more fuel efficient, the step 120 could instead or additionally assess whether manual mode would provide a performance improvement, or a desired all-wheel drive capability. The teachings of this disclosure are thus not limited to switching from automatic to manual mode to only improve fuel efficiency.

Next, at a step 140, the controller 88 monitors for an authorization command from a user to authorize a transition to the manual drive mode. The authorization could be the manual movement of the gear shift lever by the driver.

The controller 88 maintains the powertrain 10 in the automatic drive mode unless the authorization command is received. User input is required to change modes in this example. In another example, the method 100 could omit the step 140 and instead automatically move to the manual drive mode without input from the user, such as when the clutch is an e-clutch and an automated shifter is used.

In other exemplary embodiments, the method 100, when the vehicle 90 is operating in the manual drive mode, monitors whether operating in the automatic drive mode would be more fuel efficient. If the current energy use is less than or equal to the predicted energy use in both another manual gear and automatic drive mode, the method 100 initiates no alert. If the automatic drive mode would be more fuel efficient, the method 100 initiates an alert to suggest a transition from a manual drive mode to an automatic drive mode.

Although described in connection with fuel economy differences, the method 100 could compare operating in the manual drive mode and the automatic drive mode in other ways. For example, based on differences in comfort, traction, braking, etc.

One or more of the differences could be utilized by the controller 88 when assessing whether to prompt a switch from one of the automatic or manual drive modes to the other of the automatic or manual drive modes. The one or more differences could be selected by the user. For example, the user may selected fuel economy and driver convenience as desired differences.

During a drive cycle, when the driver pulls the vehicle 90 away from a stop, the controller 88 initiates an alert that suggests the automatic drive mode to the driver as a way to optimize both fuel economy and driver convenience. After reaching a threshold speed, say 40 miles per hour, the controller 88 initiates an alert that suggest the manual drive mode as a way to optimize both fuel economy and vehicle responsiveness.

In addition to suggesting the manual drive mode, the controller 88 could suggest a specific gear (e.g., $1^{st}$, $2^{nd}$, or $3^{rd}$) for when the powertrain 10 operates in the manual drive mode. The specific gear could be displayed on the display 84. The selection of the specific gear can be based on differences between the various gears of the manual transmission 30 such as, for example, efficiency differences.

In this example, the alert when the vehicle 90 reaches the threshold speed includes a suggestion to move the powertrain 10 into $4^{th}$ gear. As the drive cycle continues, and the vehicle 90 is decelerated, the controller 88 can automatically add in torque from the second electric machine 18 to avoid the driver being required to downshift.

As an example, when in the manual drive mode, the controller 88 could initiate an alert to prompt the driver to shift into different numerical gear, say $3^{rd}$ gear, if the energy use would be reduced in $3^{rd}$ gear. The alert could be "$3^{rd}$" displayed on the display 84.

For each gear of the manual transmission, the controller 88 can calculate an optimum split between power from the engine 22 and power from the second electric machine 18.

In the manual drive mode, the controller 88 could initiate an alert to shift to neutral when braking to eliminate losses from engine braking, thus enhancing regenerative braking.

When in the manual drive mode, if the energy use would be reduced in the automatic drive mode, the controller 88 could initiate an alert to prompt the driver to shift to the automatic drive mode. The alert could be a "D" displayed on the display 84.

The one or more differences could be weighted differently by the user. For example, the user may choose to weigh differences in fuel economy more heavily that driver convenience or vehicle responsiveness within the calculations performed by the controller 88 when assessing whether to prompt the switch.

In some examples, the initiating of the updates could be disabled at certain positions for the accelerator pedal 80, the brake pedal 82, or both. For example, if the driver has forced the accelerator pedal 80 down to request as much acceleration as possible, messages for fuel economy could be suppressed. In such a scenario, it can be assumed that the driver is more interested in performance than fuel economy and would consider a fuel economy message unwanted.

To help avoid excessive alerts and thereby enhance a driver's experience, a frequency limiting threshold could be programmed into the controller 88. The frequency limiting threshold limits a frequency of the initiated updates. The frequency limiting threshold could limit the updates to once every 5 seconds, for example.

Other enhancements could include, when in the manual drive mode, automatically balancing a split between front and rear axles. For example, if the electric machine and the engine drive separate axles, and the wheels of the front axle slip, the controller would automatically shift torque to rear wheels.

Another enhancement could include, when in the manual drive mode, adding electric torque to the front driveshafts 38 or rear driveshafts 46 to allow the powertrain 10 to remain in a current gear without lugging the internal combustion engine 22.

Some features of examples disclosed above include providing a powertrain that enables the driver to move a vehicle without requiring manual shifting or actuating a clutch pedal, while also providing the driver with an option to switch to a mode where an internal combustion engine drives the vehicle through a manual transmission that the driver can manually shift.

Permitting both manual transmission and automatic drive modes can reduce wear on the clutch and can facilitate driving a manual transmission vehicle in relatively demanding scenarios such as heavy traffic, city driving, and other low-speed conditions, as no shifting or clutch use is required. More precise low-speed control of the vehicle is also enabled, and quietness is enhanced when driving electrically.

The suggesting of modes, specific gears, or both, can help optimize operation of the vehicle and enhance driver satisfaction.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
    at least one electric machine that selectively drives at least one first wheel driveshaft when in an automatic drive mode;
    an engine that, through a manual transmission, selectively drives at least one second wheel driveshaft when in a manual drive mode, the second wheel driveshaft different than the first wheel driveshaft;
    a controller configured to initiate an alert that suggests a transition from the automatic drive mode to the manual drive mode; and
    a gearshift moveable between an automatic drive region and a manual shift region, the manual transmission in neutral when the gearshift is in the automatic drive region.

2. The vehicle assembly of claim 1, wherein the transition to the manual drive mode is a transition from the automatic drive mode.

3. The vehicle assembly of claim 1, wherein the alert that suggests the transition to the manual drive mode comprises a suggestion of a numbered gear.

4. The vehicle assembly of claim 1, wherein the controller is further configured to initiate another alert that, when in the manual drive mode, suggests a transition from the manual drive mode to the automatic drive mode.

5. The vehicle assembly of claim 1, wherein the at least one electric machine is at least one first electric machine, and further comprising at least one second electric machine that, through the manual transmission, selectively drives the at least one second wheel driveshaft when in the manual drive mode.

6. The vehicle assembly of claim 5, wherein the engine selectively drives the at least one second electric machine to generate electrical power that charges a traction battery, powers the at least one first electric machine, or both.

7. The vehicle assembly of claim 5, further comprising a clutch that moves between an engaged position where the engine and the at least one second electric machine are rotatably coupled to the manual transmission, and a disengaged position where the engine and the at least one second electric machine are rotatably decoupled from the manual transmission.

8. The vehicle assembly of claim 1, wherein the manual transmission includes a plurality of selectable gear positions, each providing a different gear ratio through which the engine, the at least one electric machine, or both can drive the at least one second wheel driveshaft.

9. The vehicle assembly of claim 1, further comprising a display within a passenger cabin of a vehicle, the alert displayed on the display.

* * * * *